Feb. 24, 1970  B. A. BABB  3,497,766
CONTROL ARRANGEMENT WITH ATTENUATION CIRCUIT CONTROLLING
VOLTAGE-RESPONSIVE SWITCHING MEANS
Filed Dec. 30, 1966  2 Sheets-Sheet 1
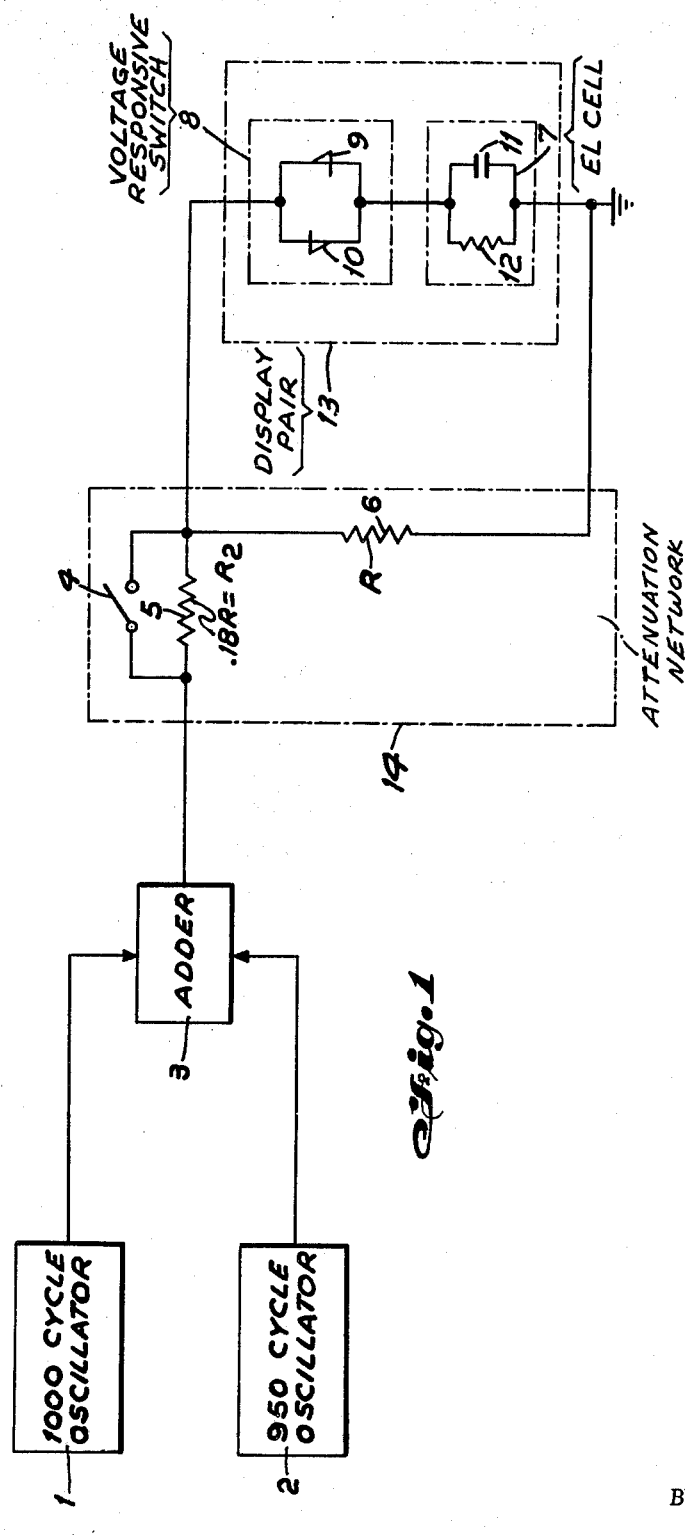
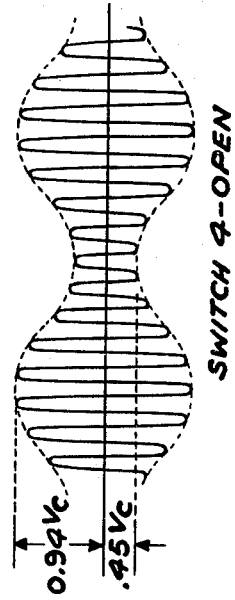
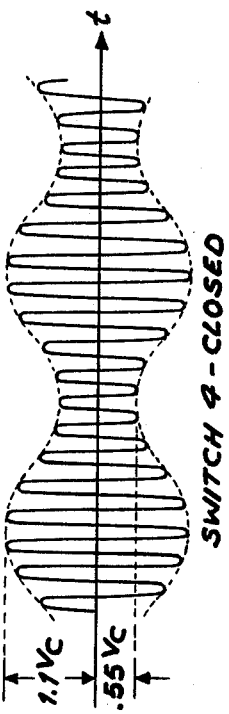
INVENTOR.
BURTON A. BABB
BY
*Leonard Holtz*
AGENT

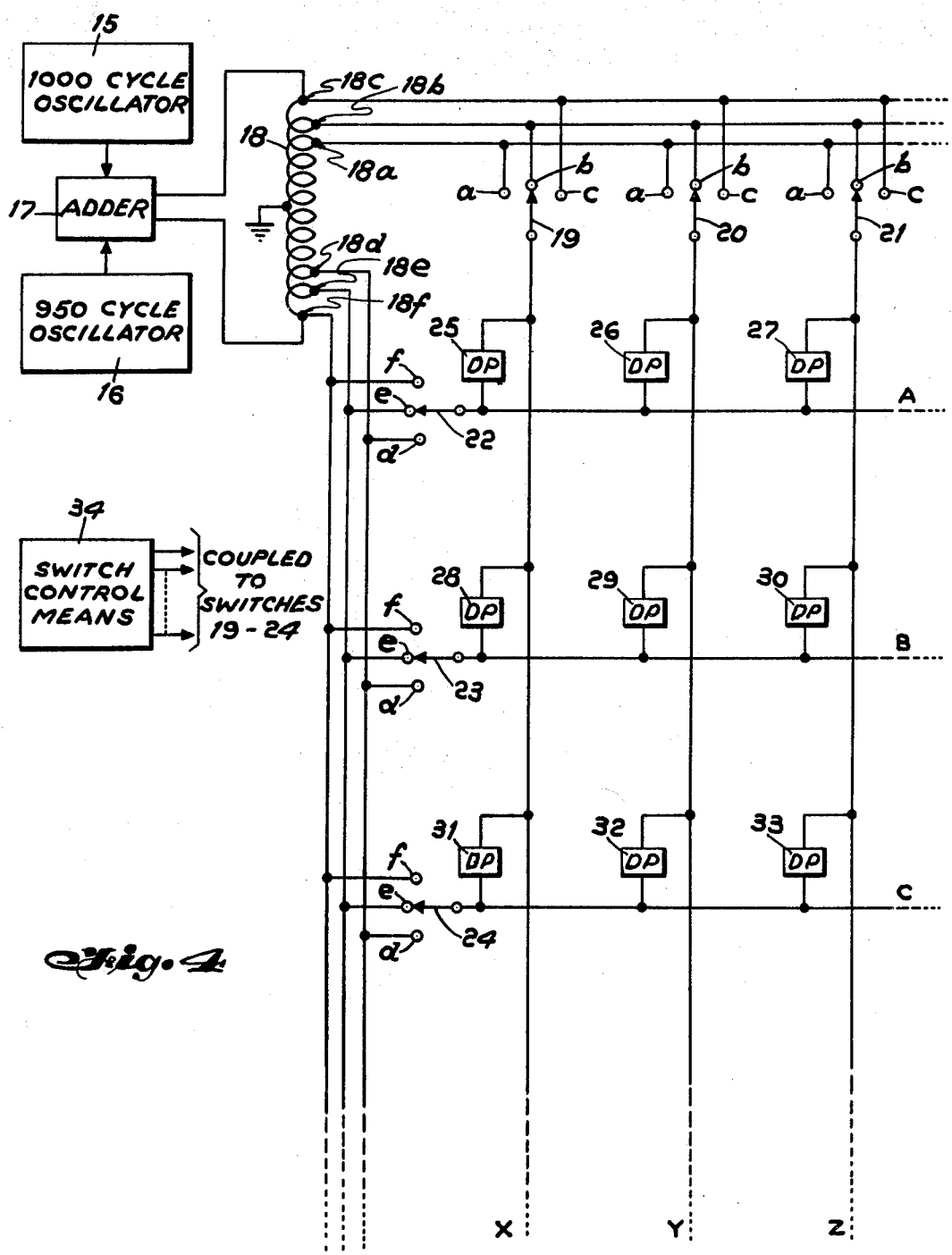

United States Patent Office 3,497,766
Patented Feb. 24, 1970

3,497,766
CONTROL ARRANGEMENT WITH ATTENUATION CIRCUIT CONTROLLING VOLTAGE-RESPONSIVE SWITCHING MEANS
Burton A. Babb, Wayne, N.J., assignor to International Telephone and Telegraph Corporation, a corporation of Delaware
Filed Dec. 30, 1966, Ser. No. 606,254
Int. Cl. H05b 37/02, 39/04, 41/36
U.S. Cl. 315—158
14 Claims

ABSTRACT OF THE DISCLOSURE

For substantially reducing the hysteresis effect inherent in the prior art methods of operating the combination of a voltage responsive switching device and a load device, i.e., electroluminescent cells, there is provided an amplitude modulated signal which operates the switch and load device via a control device which selectively varies the amplitude of the modulated signal fed thereto. The disclosure describes the application of the invention to a matrix of such load devices and voltage responsive switches.

Background of the invention

This invention relates to control circuits and more particularly to control circuits utilizing voltage responsive switches for controlling the electrical state of a load device such as electroluminescent cells and the like.

The prior art A.C. control circuits utilizing a symmetrical voltage responsive switch for controling the electrical state of a load device have the property that in order to turn off such a voltage responsive switch the applied voltage must be dropped to approximately 50 percent of the voltage required to turn the switch on. This is a sort of "hysteresis effect," the magnitude of which is normally undesirably large since it necessitates the use of high voltage switching in the control circuit in order to turn the voltage responsive switch on and off. Also, these prior art control circuits must be capable of switching the fairly high signal levels appearing in the system.

Therefore, the main object of this invention is to provide a control circuit utilizing a voltage responsive switch for controlling the electrical state of a load device with relatively small changes in control voltage, thereby substantially reducing the hysteresis effect exhibited by the voltage responsive switches presently known in the art.

Summary of the invention

According to this invention a control circuit for controlling the electrical state of a load device comprises a voltage responsive switching means series coupled to the load device. Further provided is means for generating a first alternating current signal having an amplitude insufficient alone to turn on the switching means, means for generating a second alternating current signal having a frequency lower than that of the first signal and means coupled to the outputs of the generating means for combining the first signal with the second signal so that the peak amplitude of the combined signal is greater than the turn-on voltage of the voltage sensitive switching means and the trough of the combined signal is below the turn-on voltage of the switching means. Coupling the combiner to the switching means and to the load device is a control device for controlling the peak and trough amplitudes of the combined signal, thereby controlling the electrical state of the load device.

Brief description of the drawings

The above-mentioned and other features and objects of this invention will become apparent by reference to the following description taken in conjunction with the accompanying drawings, in which:

FIGURE 1 is an illustration of a preferred embodiment of this invention;

FIGURE 2 is an illustration of the control waveform with the control switch closed;

FIGURE 3 is an illustration of the control waveform with the control switch open; and FIGURE 4 is an illustration of a preferred embodiment of this invention for use in controlling a matrix array of voltage sensitive switches and capacitive means.

Description of the preferred embodiment

This invention will be described in detail with reference to a preferred embodiment in which the load device is an electroluminescent cell (hereafter called an "EL cell") such as the device 7 illustrated in FIGURE 1. The EL cells presently known in the art act electrically like a leaky capacitor whose resistance (resistor 12 of FIGURE 1) is sufficiently high and capacitance (capacitor 11 of FIGURE 1) is sufficiently high so that its time constant is much longer than a millisecond and may be on the order of approximately 100 milliseconds.

Also, in a preferred embodiment of this invention there is included a symmetrical voltage responsive switching means 8 comprising a pair of back-to-back four layer diodes (such as diodes 9 and 10 as shown in FIGURE 1). This configuration of four layer diodes has the property that if a voltage of either polarity is applied across the combination and if the magnitude thereof is less than the critical turn-on value, $V_c$, the configuration acts as an open circuit; and if the voltage is raised above the critical turn-on voltage $V_c$, one of the four layer diodes (depending on the polarity of the input signal) will "breakdown" or "turn-on" and present virtually a short circuit in its forward direction. If the voltage thereafter falls below a turn-off value, the "on" four layer diode will turn-off and again present an open circuit until a voltage exceeding $V_c$ is again applied across its terminals. If the voltage is raised above the critical value $V_c$ but with the opposite polarity, the other four layer diode will turn on, effectively becoming a short circuit in its forward direction, until the voltage thereacross is reduced to less than its turn-off value. This configuration of switching means 8 series coupled to electroluminescent cell 7 (as shown in FIGURE 1) will hereafter be called a "display pair" 13.

It is noted that although the invention will be described herein with reference to a symmetrical voltage responsive switch comprising a pair of back-to-back four layer diodes as shown in FIG. 1, any pair of four layer diodes coupled together in series opposing may also comprise a voltage responsive switch for use in this invention. It is also noted that any other type of symmetrical voltage responsive switch other than those utilizing four layer diodes may be utilized within the spirit of the invention.

It is pointed out that although the instant invention will be described with reference to load devices comprising EL cells which exhibit a substantially capacitive characteristic, the invention may equally well be applied to a capacitive memory for a computer, for example, in which the charge on the capacitive load device determines the state of the memory. For use in such a system the EL cell is merely replaced by a standard capacitor. This is only one of many other applications of the instant invention and it should be clear that any other type of load device exhibiting a substantially capacitive characteristic may be utilized. Furthermore, the invention may equally well be practiced with any other type of impedance device comprising the load to be controlled.

In order to more fully understand the principles of this invention a discussion of the prior art operation of a display pair (such as display pair of 13 of FIGURE 1) with only a 1000 cycle unmodulated signal being applied across its terminals is deemed appropriate. The magnitude of the voltage required to turn on the voltage responsive switch 8 is assumed to be $V_c$. Since the intensity of the light emitted by an EL cell is proportional to both the amplitude of the signal applied thereacross and the frequency of said signal, a one thousand cycle signal which provides an acceptable intensity is used. Assuming that the display pair 13 is fed with a 1000 cycle unmodulated A.C. signal having a peak amplitude of 0.9 $V_c$, the voltage across the switch 8 will at this level be insufficient to render it conductive and the EL cell 7 will remain dark. If the voltage is raised to approximately $\pm 1.1$ $V_c$ the switch will turn on and become conductive during the first half cycle (i.e. diode 10 of switch 8 in FIGURE 1 for example will turn on responsive to $+1.1$ $V_c$ being applied thereto). At the zero crossing of the 1000 cycle signal the diode 10 of switch 8 will turn off, but since the time constant of the EL cell is much greater than the period of the energizing 1000 cycle signal the EL cell will remain charged to approximately $V_c$ during this zero crossing interval. When the signal reaches a small negative value, say $-.2$ $V_c$ the switch will again turn on and stay on (i.e. diode 9 of switch 8 of FIGURE 1 will turn on with this negative voltage level), with the EL cell 7 being charged to approximately $-1.1$ $V_c$. Again during the zero crossing the switch will turn off but the EL cell will remain biased due to its high time constant.

When the peak amplitude of the 1000 cycle signal is now reduced to $-.9$ $V_c$ from $-1.1$ $V_c$ the EL cell will remain lit even though the peak voltages impressed across the display pair 13 are below $\pm V_c$. This is due to a sort of "voltage-doubling" action caused by the capacitance 11 of the EL cell 7 and the fact that the cell has a time constant which is much greater than the period of the input signal. For example, on a positive peak say $+0.9$ $V_c$ of the 1000 cycle signal, the switch will turn on due to the fact that the EL cell 7 was charged to approximately $-.9$ $V_c$ on the previous negative half cycle, this charge being in such a direction as to effectively add to the positive applied voltage, thereby providing a total voltage of approximately 1.8 $V_c$ across the switch. When the switch 8 turns on the EL cell will now charge to $+.9$ $V_c$. During the next negative half cycle when the amplitude approaches $-0.2$ $V_c$, the combination of this negative voltage and the previous positive charge on the EL cell (which was $+.9$ $V_c$) will add, providing sufficient voltage across the switch 8 to break it down in the other direction, thereby again charging the EL cell to a voltage of approximately $-0.9$ $V_c$ when the negative peak is reached. Therefore, it is seen that the EL cell 7, once lit, will remain lit even when the supply voltage is dropped substantially below the critical $V_c$ turn-on voltage of the switch. In fact, in order to extinguish the EL cell 7 the peak A.C. voltage applied across the display pair 13 must be dropped to approximately $\pm 0.5$ $V_c$ or below. When the applied peak voltage is less than $\pm 0.5$ $V_c$ it is seen that the combination of the applied voltage and the previous charge on the EL cell will be less than $V_c$, and therefore the voltage sensitive switch 8 will not turn on again. When the amplitude of the input is dropped below $\pm 0.5$ $V_c$, the EL cell will actually remain charged until the charge leaks off via its internal impedance (resistor 12). In order to turn the cell back on again it is clear that the magnitude of the signal voltage must be raised to above $\pm V_c$. From the above it is seen that there is a "hysteresis effect" inherent in the above described device which makes it necessary to reduce the supply voltage peak amplitude to below $\pm 0.5$ $V_c$ (i.e. a 50% drop) to turn the EL cell off. In order to turn the cell back on the voltage amplitude must be raised to above 1.0 $V_c$ after it has been off for several time constants.

Referring now to FIGURE 1, a preferred embodiment of this invention is illustrated for use in conjunction with a single display pair 13 comprising an electroluminescent cell (EL cell) 7 series coupled to a pair of back-to-back four layer diodes 9 and 10. This circuit substantially reduces the above-described hysteresis effect. It is to be noted that the embodiment shown in FIGURE 1 may be expanded within the spirit of this invention to operate a plurality of such display pairs 13 either singly or coupled together in a matrix format. Coupled across the display 13 pair is a resistor 6 of value R. Coupled to resistor 6 is a second resistor 5 which is shunted by switch 4. Resistors 5 and 6 and switch 4 comprise attenuation network 14. Switch 4 and resistor 5 couple the display pair to an adder (or amplitude modulator) 3 which is being fed by oscillators 1 and 2 which supply 1000 cycle and 950 cycle signals, respectively. The output of adder 3 is therefore a 1000 cycle signal amplitude modulated at 50 cycles as shown in FIGURES 2 and 3. The waveforms of FIGURES 2 and 3 are approximate representations of the actual waveforms, the 1000 cycle signal being illustrated as a much lower frequency for ease of illustration.

Switch 4 is for controlling the state of the display pair 13, and therefore the state of the load device (the EL cell). In general, when switch 4 is closed the full output from the adder 3 is applied across the display pair 13 and resistor 6, thereby causing the symmetrical voltage responsive switch 8 comprising four layer diodes 9 and 10 to turn on, lighting the EL cell 7. When switch 4 is opened the voltage appearing across the display pair 13 is attenuated by the voltage divider ratio provided by resistors 5 and 6, thereby turning off the voltage responsive switch 8 and extingushing the EL cell 7. The voltage divider ratio of resistors 5 and 6 is only required to attenuate the voltage fed to the display pair 13 by approximately 15 percent, in order to turn off a previously lit EL cell whereas in the prior art control circuit the signal had to be dropped by a factor of approximately 50 percent. The sequence of events by which this phenomenon takes place is explained below.

The output of the adder 3 is shown in FIGURE 2 and consists of a 1000 cycle signal modulated at 50 cycles, the peak amplitude of the modulated signal being approximately 1.1 $V_c$ and the peak amplitude of the trough of the modulated signal being approximately 0.55 $V_c$. Switch 4 is closed for controlling the state of the display pair. When the switch is closed, the full output of the adder 3 (shown in FIGURE 2) is applied across the display pair 13; and when switch 4 is opened, the voltage fed to the display pair is attenuated (shown in FIGURE 3) by the voltage divider ratio of resistors 5 and 6.

With switch 4 closed, when the peak amplitude is 1.1 $V_c$ the EL cell will light up, as the voltage responsive switch will have been activated. Each time the signal makes the transition through zero volts the EL cell will be discharged and will recharge on the next negative half cycle. This charging, discharging and recharging occurs 2000 times per second with a 1000 cycle excitation signal, this being rapid enough not to be perceptable to the human eye. Thus, to the human eye, the EL cell emits a substantially constant level of illumination. Due to the voltage doubling effect previously described herein, it is clear that the EL cell will not be permanently extinguished (or discharged) during the trough of the amplitude modulated signal as long as the peak voltage of the trough is approximately 0.55 $V_c$ or greater. This is because the EL cell will retain the charge from the previous half cycle, and this charge combined with the excitation signal level of 0.55 $V_c$ provides a total effective excitation of approximately 1.1 $V_c$ which is enough to turn on said voltage responsive switch 8.

Now if it is desired to turn EL cell 7 off for an extended period of time one must merely open switch 4, thereby attenuating the signal (see FIGURE 3) applied to the display pair 13 by a factor $(R/R+R_2)$. In this particular case, the voltage is attenuated by approximately 15 percent by the attenuation network 14. Therefore, the peak amplitude of the amplitude modulated signal will now be approximately 0.94 $V_c$ and the peak amplitude of the trough will be approximately 0.4 $V_c$, as illustrated in FIGURE 3. If the switch 4 is opened when the signal amplitude is above 0.5 $V_c$ the EL cell will momentarily remain lit until the signal peak amplitude falls below 0.5 $V_c$ (i.e. during the trough of the amplitude modulated signal). When this occurs the voltage responsive switch 8 will not turn on during the peaks of the signal even due to the voltage doubling effect since after the voltage doubling the signal is still less than 1.0 $V_c$. Since the voltage sensitive switch 8 was not turned on during this part of the cycle the EL cell 7 will continue to discharge via its internal resistance 12 so that it will not be relighted when the signal rises back to the peak amplitude of $\pm 0.94$ $V_c$. This is because the time constant of the EL cell is chosen to be short enough so that it will be discharged sufficiently during the trough of the excitation signal so that it will not be relighted as the amplitude modulated signal starts to rise to its peak value. While this will cause a delay in extinguishing the EL cell (since it must discharge via its internal resistance before it is extinguished), this delay is actually inconsequential since it will be somewhat less than one-half of the period of the low frequency modulation envelope, (i.e., less than 5 milliseconds when the 1000 cycle supply is amplitude modulated at 50 cycles per second by means of adder 3).

It should be clear that the mechanical switch 4, shown in FIGURE 1 as part of attenuater 14, may be replaced by an electronic switching device such as a transistor or silicon controlled rectifier or any other type of applicable switching device presently known in the art. This choice of switching device 4, of course, will depend upon the electrical requirements and the particular use to which the system herein described is being put, and should be capable of being made within the spirit of this invention by one reasonably skilled in the art.

Therefore, by the means of the inventive circuit, it is seen that a relatively small percentage change in the amplitude of the applied signal renders the EL cell 7 completely on or completely extinguished. This is an improvement over the prior art configuration whereby substantially larger changes in signal level are required to control the state of similar load devices.

Referring now to FIGURE 4, there is shown another embodiment of this invention for use with a matrix array of display pairs. Such a matrix configuration is extremely useful in the display and television art. A 3 x 3 matrix having rows A, B and C and columns X, Y and Z is shown in FIGURE 4 merely by way of example and for ease of explanation. It is to be understood that any other size matrix may be used if desired. A 1000 cycle oscillator 15 and a 950 cycle oscillator 16 are coupled to an added 17 in the same manner as was shown in FIGURE 1. It is clear that an amplitude modulator may also be used by making appropriate modifications to the system. The output of adder 17 is a push-pull signal which is applied to a multi-tapped transformer 18. This signal is a 1000 cycle signal amplitude modulated at 50 cycles and looks like the signal illustrated in FIGURE 2. Columns X, Y and Z are coupled to transformer 18 via single-pole, three-position switches 19, 20 and 21, respectively and rows A, B and C are coupled to transformer 18 via single pole, three-position switches 22, 23 and 24, respectively. The switches 19–24 are operated by control means 34 which selectively operates switches 19–24 to a desired position. A detailed description of a control means 34 is deemed unnecessary for a proper understanding of the instant invention since such control means are well known in the art. Coupled at the cross points of the rows and columns are display pairs 25 through 33, respectively.

The maximum peak to peak amplitude of the output signal taken between taps 18c and 18f of transformer 18 is approximately 1.1 $V_c$ where $V_c$ refers to the critical voltage above which a voltage responsive switch contained in display pairs 25–33 will turn on. The trough of the amplitude modulated signal appearing between taps 18c and 18f is greater than 0.5 $V_c$. This output also appears across terminals c and terminal f of any of the switches 19 through 24. The signal appearing between taps 18c and 18f of transformer 18 is substantially the same as the amplitude modulated signal shown in FIGURE 2. Appearing between taps 18b and 18e of transformer 18 is a signal having a maximum peak amplitude of less than 1.0 $V_c$ and having a trough amplitude of greater than 0.5 $V_c$. This signal also appears between terminals b and e of any of the switches 19–24. Appearing between terminals 18a and 18d is a signal having a maximum peak amplitude of less than 1.0 $V_c$ and a trough amplitude of less than 0.5 $V_c$. This signal also appears between terminals a and d of any of the switches 19–24. Another limitation on the amplitude of the signals at the various taps of transformer 18 is that the maximum peak amplitude of the signal appearing between taps 18c and 18e and between taps 18b and 18f is less than 1.0 $V_c$ and the trough of these signals is greater than 0.5 $V_c$. Also the trough of the signals appearing between taps 18b and 18d and between taps 18c and 18e is greater than 0.5 $V_c$ and the maximum peak amplitude of these signals is less than $V_c$.

Assuming that all of the display pairs 25–33 are extinguished, if one desires to turn on display pair 25, corresponding to the cross point of row A and column X, for example, switch 19 must be set to position c and switch 22 must be set to position f. This applies a maximum peak voltage of approximately 1.1 $V_c$ across display pair 25, thereby turning said display pair on in a manner fully described with reference to the embodiment shown in FIGURE 1. Assuming that the row switches 23 and 24 are in position e and that column switches 20 and 21 are in position b, none of the other display pairs 26–33 will be affected by the switching of switches 19 and 22. This is because display pairs 26 and 27 have the voltage between taps 18b and 18f applied thereacross and display pairs 28 and 31 have the voltage between taps 18e and 18c applied thereacross. The maximum peak amplitude of these two signals (between taps 18b and 18f and between taps 18e and 18c) is always less than 1.0 $V_c$ so none of these display pairs 26–28 and 31 will turn on (assuming that they were previously extinguished); and the trough of these two signals is always greater than 0.5 $V_c$, so also none of the display pairs 26–28 and 31 will be extinguished if they were previously lit. After display pair 25 has been lit, switches 19 and 22 may be reset back to positions a and $e$, respectively, whereby the display pair 25 is held in its lit condition. The fact that display pair 25 will now remain lit should be clear from the previous discussion with reference to FIGURE 1 since the peak signal applied thereacross is less than 1.0 $V_c$ and is always greater than 0.5 $V_c$.

From the above discussion it is seen that this arrangement shown in FIGURE 4 combines the virtues of reducing the hysteresis effect while still maintaining enough hysteresis so that the display pairs exhibit a memory, i.e. when a display pair is lit, it will remain lit until the trough of the amplitude modulated signal applied thereto falls below 0.5 $V_c$. The use of an amplitude modulated excitation signal reduces the hysteresis effect so that low voltage switching means 19–24 may be utilized.

In order to extinguish display pair 25 without disturbing the condition of the other display pairs 26 through 33, switch 19 is placed in position $a$ and switch 22 is placed in position $d$. The signal now appearing across display pair 25 will have a trough which is less than 0.5 $V_c$, thereby extinguishing display pair 25 in the same manner as described with reference to the embodiment of FIGURE 1. None of the other display pairs 26 through 33 will be disturbed by this switching sequence since only one side of any one of the other display pairs is effected by the switching. At all times the trough of the applied signal to the other display pairs will be greater than 0.5 $V_c$. Thereby, any of the previously lit display pairs will remain lit and any of the previously extinguished display pairs will remain extinguished during this operation. For example, when switch 19 is moved to position $a$, display pair 28 has the signal from taps 18$a$ and 18$e$ applied thereacross, which signal has a peak amplitude of less than 1.0 $V_c$ and a trough amplitude greater than 0.5 $V_c$.

An advantage to the above described system is that only one power source comprising oscillators 15 and 16, adder 17 and transformer 18 is required for the complete system. If, however, the power requirements of the system are too high for one power source, then a plurality of such sources may be coupled to the circuit so that the power requirement is met. A disadvantage of the circuit is that three-position switches must be used for coupling each column conductor and each row conductor to the power source. The electrical switching requirements however, of these switches is very low due to the fact that a modulated power source is used which substantially reduces the hysteresis effect in the display pairs, thereby allowing less of a change in control voltage to change the state of the load.

Also, the fact that three-position switches must be utilized is not over-burdening the system design since as the system is made larger this disadvantage becomes less significant. This is because as the system gets larger the ratio of three-position switches to display pairs being controlled becomes smaller. For example, in a 3 x 3 matrix 6 switches control 9 display pairs (see FIGURE 4) and in a 4 x 4 matrix 8 switches control 16 display pairs.

Switches 19 through 24 have been shown in FIGURE 4 as metchanical switches, but it is recognized that any other type of switching device such as SCR switches and other electronic type switches may be used in place thereof. Also electro-mechanical switches such as stepping relays may be utilized. The choice of switching means 19–24 merely depends on the overall system requirements and may therefore be chosen by one ordinarily skilled in the art within the spirit of this invention.

I claim:
1. A control circuit comprising:
 (a) a display pair including a load device and voltage-responsive switching means, coupled to said load device, having a predetermined firing voltage;
 (b) a source of amplitude modulated signals having peak amplitudes greater than the firing voltage of said switching means and trough amplitudes less than said firing voltage; and
 (c) attenuation means, coupling said source of modulated signals to said display pair, for selectively controlling the peak and trough amplitudes of said modulated signals fed to said display pair, controlling thereby the state of said switching means and said load device.

2. A control circuit according to claim 1 wherein said voltage-responsive switching means include a pair of back-to-back four-layer semiconductive devices.

3. A control circuit according to claim 1 wherein said load device and said voltage-responsive switching means are series coupled.

4. A control circuit according to claim 1 wherein said control means includes:
 a first resistor;
 a second resistor, one terminal thereof being coupled to said first resistor;
 a switch coupled in parallel with said second resistor;
 means coupling another terminal of said second resistor to said combining means; and
 means further coupling said first resistor in parallel with said voltage responsive switching means and said load device.

5. A display system comprising:
 a plurality of display pairs, each said display pair including a load device coupled to a voltage responsive switching means having a predetermined firing voltage;
 first conducting means including at least one conductor;
 second conducting means including a plurality of conductors;
 means coupling said display pairs between selected conductors of said first and second conducting means;
 means for generating a first alternating current signal having an amplitude insufficient alone to turn on said voltage responsive switching means;
 means for generating a second alternating current signal having a frequency lower than that of said first signal;
 means coupled to said first and second generating means for combining the first signal with said second signal so that the peak amplitude of the combined signal is greater than the firing voltage of said switching means and the trough of the combined signal is below said firing voltage; and
 control means coupling said combining means to said first and second conducting means for selectively controlling the peak and trough amplitudes of said combined signal being fed to selected conductors of said first and second conducting means, thereby controlling the state of selected display pairs.

6. A display system according to claim 5 wherein said load device is series coupled with said voltage responsive switching means.

7. A display system according to claim 5 wherein said load device includes an electroluminescent cell.

8. A display system according to claim 5 wherein said control means includes:
 a transformer coupled to the output of said combining means, said transformer having an output winding having a plurality of pair of taps thereon, each pair of taps providing an output signal having a different amplitude; and
 switching means coupling selected pairs of taps of said output winding of said transformer across selected display pairs, the taps across which said display pairs are coupled determining the state of the selected display element.

9. A display system according to claim 8 wherein said switching means includes:
 a first plurality of switches selectively coupling the conductors of said first conducting means to selected taps on said output winding of said transformer; and
 a second plurality of switches selectively coupling the conductors of said second conducting means to selected taps on the output winding of said transformer.

10. A display system according to claim 9 wherein the output winding of said transformer has at least three pairs of taps.

11. A display system according to claim 10 wherein said first and second pluralities of switches include first and second pluralities of single pole, three position switches.

12. A display system according to claim 5 wherein said first conducting means is arranged transverse to said second conducting means.

13. A display system according to claim 5, wherein said combining means includes an adding means.

14. A display system according to claim 5 wherein said combining means includes an amplitude modulator.

References Cited
UNITED STATES PATENTS

| | | | |
|---|---|---|---|
| 2,920,239 | 1/1960 | Saeger | 315—170 |
| 2,922,076 | 1/1960 | Sack et al. | 315—71 |
| 3,115,593 | 12/1963 | Hauer | 315—171 |
| 3,252,048 | 5/1966 | Sack | 315—169 |
| 3,311,781 | 3/1967 | Dunker et al. | 315—173 |

JOHN W. HUCKERT, Primary Examiner

SIMON BRODER, Assistant Examiner

U.S. Cl. X.R.

315—149, 176